United States Patent [19]
Gallucci et al.

[11] Patent Number: 5,648,411
[45] Date of Patent: Jul. 15, 1997

[54] THERMOPLASTIC BLEND COMPOSITIONS CONTAINING POLYESTER RESINS AND AN ORGANOSULFATE SALT

[75] Inventors: Robert Russell Gallucci; Paul Joseph Hans, both of Mt. Vernon, Ind.

[73] Assignee: General Electric Company, Pittsfield, Mass.

[21] Appl. No.: 483,022

[22] Filed: Jun. 7, 1995

[51] Int. Cl.$^6$ ................................................ C08K 5/41
[52] U.S. Cl. ................................................ 524/156
[58] Field of Search ............................... 524/156, 912

[56] References Cited

U.S. PATENT DOCUMENTS

| | | | |
|---|---|---|---|
| 3,305,520 | 2/1967 | Fritz et al. | 524/151 |
| 3,953,539 | 4/1976 | Kawase et al. | 524/151 |
| 4,088,709 | 5/1978 | Seymour et al. | 524/151 |
| 4,222,910 | 9/1980 | Tokuda | 524/156 |
| 4,246,378 | 1/1981 | Kometani et al. | 524/156 |
| 4,257,937 | 3/1981 | Cohen et al. | 524/493 |
| 4,532,290 | 7/1985 | Jaquiss et al. | 524/417 |
| 4,791,158 | 12/1988 | Lausberg et al. | 524/156 |
| 4,965,308 | 10/1990 | Roovers . | |
| 4,965,338 | 10/1990 | Tabankia et al. . | |
| 4,981,898 | 1/1991 | Bassett | 524/417 |
| 5,045,582 | 9/1991 | Hashimoto et al. | 524/156 |
| 5,367,011 | 11/1994 | Walsh . | |
| 5,494,952 | 2/1996 | Hirata et al. | 524/156 |

FOREIGN PATENT DOCUMENTS

| | | |
|---|---|---|
| 89111384 | 3/1990 | European Pat. Off. . |
| 357896 | 3/1990 | European Pat. Off. . |
| 0185555 | 12/1990 | European Pat. Off. . |
| 3627131 | 2/1988 | Germany . |
| 61-66731 | 4/1986 | Japan . |
| 63-43950 | 2/1988 | Japan . |
| 050-1217 | 1/1993 | Japan . |
| 52-39331 | 9/1993 | Japan . |
| 1060401 | 3/1967 | United Kingdom . |

OTHER PUBLICATIONS

CAS 105:80042q CAS 119:9869y CAS 113:60676m CAS 119:27269.

B. Jacques et al : J. Polymer Science : Part A: Polymer Chemistry, vol. 34,1189–1194 (1996).

W. A. Smith et al: J. Applied Polymer Science, vol. 26, 4233–4245 (1981).

M. Kimura et al: J. Applied Polymer Science, vol. 29, 1629–1638 (1984).

*Primary Examiner*—Veronica P. Hoke

[57] ABSTRACT

Thermoplastic compositions exhibiting enhanced melt stability are provided. The compositions contain a blend of resins and an organosulfate salt. The resin blends are preferably selected from (a) a blend of a polyester resin, such as polybutylene terephthalate, and aromatic polycarbonate resin, and (b) a blend of a low molecular weight polyester resin and a high molecular weight polyester resin. The compositions exhibit enhanced retentions of cystallinity and related properties, during melt processing.

11 Claims, No Drawings

THERMOPLASTIC BLEND COMPOSITIONS CONTAINING POLYESTER RESINS AND AN ORGANOSULFATE SALT

BACKGROUND OF THE INVENTION

1. Field of the Invention

The present invention relates to melt stabilized thermoplastic compositions, and more particularly relates to melt stabilized polyesters blend compositions.

2. Description of the Related Art

Thermoplastic blends of low molecular weight polyester resin and high molecular weight polyester resin are known, See Walsh, U.S. Pat. No. 5,367,011, issued Nov. 22, 1994, which is incorporated herein by reference; and thermoplastic blends of polyester resin and aromatic polycarbonate resin are known, see Roovers et al., U.S. Pat. No. 4,965,308, issued Oct. 23, 1990, which is incorporated herein by reference. As set out in the above references, such blend compositions can experience instability due to transesterification of the resins in the blends. Walsh, U.S. Pat. No. 5,367,011 teaches utilizing phosphorus containing compounds in blends of high molecular weight polyester resin and low molecular weight resins; and Roovers et al., U.S. Pat. No. 4,965,308, teaches stabilizing mixtures of aromatic polycarbonate and aromatic polyester with a sulphurous compound such as zinc sulphate ($ZnSO_4 \cdot 7HOH$), sulphuric acid, sulphurous acid, metal sulphites, metal bisulphites, metal hydrogen sulphate and metal thiosulphate.

Additionally, various sulphurous compounds such as alkyl-aryl sulphonates have been disclosed as antistatic additives for polyesters, and sodium lauryl sulphate has been set out in EP8911384 as an unsatisfactory additive for polyesters due to being hard to mix with polyester in an extruder. Sulphonate-type anionic antistatic agents have been disclosed as additives for polybutylene terephthalate resin, see EP0185555 published Jun. 25, 1986. However, additives such as alkyl-aryl sulfonic acid sodium salts are generally not effective in preventing molecular weight build up in polyester blends or in suppressing polycarbonate-polyester interreactions. Additionally, various additives can have undesirable drawbacks or lack effectiveness in stabilizing the polyester blend compositions.

Consequently, there is a desire to provide effective melt stabilizers for polyester blend compositions, and preferably to provide stabilizers which are readily available, inexpensive and safe for use in such blends.

DETAILED DESCRIPTION OF THE INVENTION

The thermoplastic composition comprises (a) a resin blend selected from (i) a blend of a high molecular weight polyester and a low molecular weight polyester and (ii) a blend of a polyester resin and an aromatic polycarbonate resin; and (b) an organo sulfate salt. The organo sulfate salt is present in an effective melt viscosity stabilizing amount, and is preferably present in an amount of from 0.01 to 5 percent by weight based on the total weight of the composition, more preferably from 0.05 to 1 percent by weight thereof, and most preferably from 0.05 to 0.2 percent by weight thereof.

A low molecular weight polyester, preferably low molecular weight polybutylene terephthalate (PBT) useful in the practice of the present invention is a PBT resin having a melt viscosity of less than 600 poise at 250° C., more preferably less than about 450 poise at 250° C., and most preferably less than about 300 poise at 250° C.

The preferred high molecular weight polyester resins useful in the practice of the present invention are PBT resins having a melt viscosity above about 600 poise at 250° C., more preferably above about 900 poise, and most preferably above about 1100 poise.

The low molecular weight polyester resin, preferably low molecular weight polybutylene terephthalate resin employed in the present invention is typically one obtained by polymerizing a glycol component at least 70 mol %, preferably at least 80 mol %, of which comprises a tetramethylene glycol; and an acid component at least 70 mol %, preferably at least 80 mol %, of which comprises terephthalic acid, and polyester-forming derivatives thereof. Particularly useful is poly(1,4-butylene terephthalate).

Preferably, the glycol does not contain more than 30 mol %, more preferably not more than 20 mol %, of another glycol, such as ethylene glycol, trimethylene glycol, 2-methyl-1,3-propane glycol, hexamethylene glycol, decamethylene glycol, cyclohexane dimethanol, or neopentylene glycol. Examples of other copolycondensable polyols include 1,3-propylene glycol, pentaerythritol, 1,6-hexanediol, polyethylene glycol and polytetramethylene glycol.

Preferably the acid component contains not more than 30 mol %, more preferably not more than 20 mol % of another acid such as isophthalic acid, 2,6-naphthalenedicarboxylic acid, 1,5-naphthalenedicarboxylic acid, 4,4'-diphenyldicarboxylic acid, 4,4'-diphenoxyethanedicarboxylic acid, p-hydroxy benzoic acid, sebacic acid, adipic acid and polyester-forming derivatives thereof. Examples of other copolycondensable polycarboxylic acids include azelaic acid, dodecane dicarboxylic acid, trimellitic acid, trimesic acid and hexahydroterephthalic acid.

The low molecular weight PBT resins can be prepared according to methods known to those of ordinary skill in the art, or they may be obtained commercially. Low molecular weight PBT is, e.g., VALOX® 195 having a melt viscosity of about 300 poise at 250° C. from General Electric Company.

The high molecular weight polyester resins, preferably high molecular weight polybutylene therephthalate, are those which are prepared in similar manner to the low molecular weight polyester resins, i.e., by polymerizing a glycol component and an acid component. Typically they are derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid and have repeating units of the following general formula:

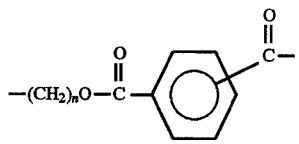

wherein n is an integer of from 2 to 6. The most preferred polyesters are poly(ethylene terephthalate), poly(1,4-butylene terephthalate) and mixtures thereof.

Also contemplated for use herein as the high molecular weight polyesters, are the above polyesters with minor amounts, e.g., from 0.5 to about 5 percent by weight, of units derived from aliphatic acids and/or aliphatic polyols to form copolyesters. The aliphatic polyols include glycols, such as poly(ethylene glycol). All such polyesters can be made following the teachings of, for example, U.S. Pat. Nos. 2,465,319 and 3,047,539.

Also useful as the high molecular weight polyesters are those derived from a cycloaliphatic diol and an aromatic dicarboxylic acid and which are prepared, for example, by condensing either the cis- or trans-isomer (or mixtures thereof) of, for example, 1,4-cyclohexanedimethanol with an aromatic dicarboxylic acid so as to produce a polyester having recurring units of the following formula:

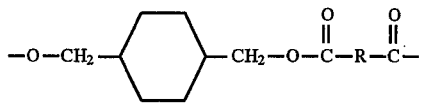

wherein the cyclohexane ring is selected from the cis- and trans- isomers thereof and R represents an aryl radical containing from 6 to about 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di-(p-carboxyphenyl)ethane, 4,4'-dicarboxydiphenyl ether, etc., and mixtures of these. All of these acids contain at least one aromatic nucleus. Acids containing fused rings can also be present, such as in 2,6- or 1,5-naphthalenedicarboxylic acids. The preferred dicarboxylic acids are terephthalic acid or a mixture of terephthalic and isophthalic acids.

Another useful high molecular weight polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

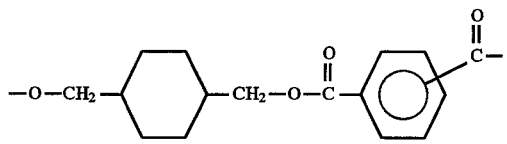

Still another useful high molecular weight polyester is a copolyester derived from a cyclohexanedimethanol, an alkylene glycol and an aromatic dicarboxylic acid. These copolyesters are prepared by condensing either the cis- or trans-isomer (or mixture thereof) of, for example, 1,4-cyclohexanedimethanol and an alkylene glycol with an aromatic dicarboxylic acid so as to produce a copolyester having units of the formulae:

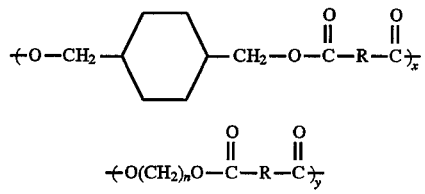

wherein the cyclohexane ring is selected from the cis- and trans- isomers thereof, R is as previously defined, n is an integer of 2 to 6, the x units comprise from about 10 to about 90 percent by weight and the y units comprise from about 90 to about 10 percent by weight.

The high molecular weight polyesters described herein are either commercially available or can be produced by following methods well known in the art, such as those set forth in, for example, U.S. Pat. Nos. 2,901,466, 2,465,319 and 3,047,539.

Particularly suitable for practice of the present invention is high molecular weight PBT, which is sold commercially as VALOX® 295 (melt viscosity of about 1100 poise at 250° C.) or VALOX® 315 (melt viscosity of about 8500 poise at 250° C.), both available from General Electric Company.

The polyester blend can comprise the low molecular weight polyester resin in amounts ranging from about 5 to about 95, preferably from about 20 to about 80, more preferably from about 30 to about 70 and most preferably from about 40 to about 60 parts by weight based on 100 total parts by weight of the low molecular weight polyester and high molecular weight polyester resins taken together. Accordingly, the polyester blend comprises the high molecular weight polyester resin in amounts ranging from about 95 to about 5, preferably from about 90 to about 10, more preferably from about 70 to about 30 and most preferably from about 60 to about 40, parts by weight based on 100 total parts by weight of the low molecular weight polyester and high molecular weight polyester resins taken together.

Aromatic polycarbonates are materials known per se. They are generally prepared by reacting a dihydric phenol compound with a carbonate precursor, for example, phosgene, a halogen formate or a carbonate ester. Aromatic polycarbonates are polymers which comprise units of the formula

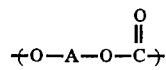

wherein A is a bivalent aromatic radical derived from the dihydric phenol used in the preparation of the polymer. Mononuclear or polynuclear aromatic compounds which comprise two hydroxy radicals which are each directly bonded to a carbon atom of an aromatic nucleus may be used as dihydric phenols in the preparation of the aromatic polycarbonates.

Examples of suitable dihydric phenols are: 2,2-bis-(4-hydroxyphenyl)propane; 2,2-bis(3,5-dimethyl-4-hydroxyphenyl)propane; 2,2-bis(3,5-dibromo-4-hydroxyphenyl)propane; 2,2-bis(3,5-dichloro-4-hydroxyphenyl)propane; hydroquinone; resorcinol; 2,2-bis-(4-hydroxyphenyl)pentane; 2,4'-(dihydroxy diphenyl) methane; bis(2-hydroxyphenyl)methane; bis-(4-hydroxyphenyl)methane; bis-(4-hydroxy-5-nitrophenyl) methane; 1,1-bis-(4-hydroxyphenyl)ethane; 3,3-bis(4-hydroxyphenyl)pentane; 2,6-dihydroxy naphthalene; bis-(4-hydroxydiphenyl)sulfone; bis-(3,5-diethyl-4-hydroxyphenyl)sulfone; 2,2-bis-(3,5-dimethyl-4-hydroxyphenyl)propane; 2,4'-dihydroxyphenyl sulfone, 5'-chloro-2,4'-dihydroxydiphenylsulfone; bis-(4-hydroxyphenyl) diphenyl sulfone; 4,4'-dihydroxydiphenyl ether; 4,4'-dihydroxy-3,3-dichlorodiphenyl ether; 4,4'-dihydroxy-2,5-dihydroxy diphenyl ether.

Other dihydric phenols which are also suitable are described in U.S. Pat. Nos. 2,999,835, 3,028,365, 3,334,154, and 4,131,575.

The aromatic polycarbonates can be prepared according to methods known per se: for example, by reacting a dihydric phenol with a carbonate precursor, for example, phosgene. For this purpose, reference may be made to the just-mentioned United States Patent Specifications and to U.S. Pat. Nos. 4,098,750 and 4,123,436. They may also be prepared by a transesterification as described in U.S. Pat. No. 3,153,008.

The known branched polycarbonates are described for example, in U.S. Pat. No. 4,001,184 are also suitable.

Suitable aromatic polycarbonates are also the so-called polyester carbonates which are obtained by carrying out the polymerisation reaction in the presence of an ester precursor, for example, a difunctional ester-forming derivative thereof. These polyester carbonates have ester compounds and carbonate compounds in the polymeric chain. Polyester carbonates are described, for example, in U.S. Pat. No. 3,169,121.

In the polymer mixtures according to the invention it is also possible to use as an aromatic polycarbonate a mixture of various polycarbonates as mentioned hereinbefore.

Polyesters suitable for use in the polyester/polycarbonate blends as Component B of the present compositions include those comprising structural units of the formula below:

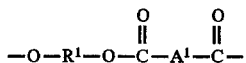

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof. Examples of suitable polyesters containing the structure of formula above are poly(alkylene dicarboxylates), elastomeric polyesters, liquid crystalline polyesters, polyarylates, and polyesteramides. Also included are polyesters that have been treated with relatively low levels of diepoxy or multi-epoxy compounds. It is also possible to use a branched polyester in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make a branched polyester. Furthermore, it is sometimes desirable to have various concentrations of acid and hydroxyl endgroups on the polyester, depending on the ultimate end-use of the composition.

The $R^1$ radical may be, for example, a $C_{2-10}$ alkylene radical, a $C_{6-10}$ alicyclic radical, a $C_{6-10}$ aromatic radical or a polyoxyalkylene radical in which the alkylene groups contain about 2–6 and most often 2 or 4 carbon atoms. The $A^1$ radical in the above formula is most often p- or m-phenylene or a mixture thereof. This class of polyesters includes the poly(alkylene terephthalates), the poly(alkylene naphthalates) and the polyarylates. Polyesters are known in the art as illustrated by the following U.S. Patents, which are incorporated herein by reference.

U.S. Pat. Nos. 2,465,319 2,720,502 2,727,881 2,822,348 3,047,539 3,671,487 3,953,394 4,128,526

The poly(alkylene terephthalates), for example, poly(ethylene terephthalate) (commonly abbreviated as "PET"), poly(cyclohexyldimethanol terephthalate) (commonly abbreviated as "PCT"), and poly(butylene terephthalate) (commonly abbreviated as "PBT") are examples of suitable polyesters for the present invention. Additional suitable polyesters include poly(alkylene naphthalate)s such as, for example, poly(alkylene-2,6-naphthalate)s including poly(butylene-2,6-naphthalate) (commonly abbreviated "PBN") and poly(ethylene-2,6-naphthalate) (commonly abbreviated "PEN"). Liquid crystalline polyesters having melting points less that about 380° C. and comprising recurring units derived from aromatic diols, aliphatic or aromatic dicarboxylic acids, and aromatic hydroxy carboxylic acids are also useful. Examples of useful liquid crystalline polyesters are those described in U.S. Pat. Nos. 4,664,972 and 5,110,896, which are incorporated herein by reference. Various mixtures of polyesters are also sometimes very suitable.

Because of the tendency of polyesters to undergo hydrolytic degradation at the high extrusion and molding temperatures encountered by the compositions of this invention, it is preferred that the polyester be substantially free of water. The polyester may be predried before admixing with the other ingredients. More commonly, the polyester is used without predrying and the volatile materials are removed through the use of vacuum venting the extruder.

The polyesters generally have number average molecular weights in the range of about 20,000–70,000, as determined by gel permeation chromotography (GPC) using polystyrene standards.

The organo sulfate salts may be generally represented by the formula:

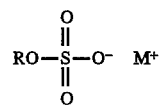

wherein R is preferably a $C_{12}$ to $C_{20}$ alkyl or alkyl aryl group (R may be branched or linear), and M is preferably an alkali metal or alkaline earth metal, for example Group IA metals or Group IIA metals, and more specifically, for example, sodium, potassium, lithium and calcium. Preferably one alkyl sulfate salt is sodium dodecyl sulfate.

In other embodiments of the present invention, the compositions can further comprise impact modifiers. Particularly useful impact modifiers generally comprise rubbery impact modifiers. These are well known to those skilled in the art, and any of them normally employed with polyester resins may be employed herein.

The preferred impact modifiers generally comprise an acrylic or methacrylic grafted polymer of a conjugated diene or an acrylate elastomer, alone, or copolymerized with a vinyl aromatic compound. Particularly useful are the core-shell polymers of the type available from Rohm & Haas, for example, those sold under the trade designation Acryloid®. In general these impact modifiers contain units derived from butadiene or isoprene, alone or in combination with a vinyl aromatic compound, or butyl acrylate, alone or in combination with a vinyl aromatic compound. The aforementioned impact modifiers are believed to be disclosed in Fromuth et al., U.S. Pat. No. 4,180,494; Owens, U.S. Pat. No. 3,808,180; Farnham et al., U.S. Pat. No. 4,096,202; and Cohen et al., U.S. Pat. No. 4,260,693. Most preferably, the impact modifier will comprise a two stage polymer having either a butadiene or butyl acrylate based rubbery core and a second stage polymerized from methylmethacrylate alone, or in combination with styrene. Also present in the first stage are crosslinking and/or graftlinking monomers. Examples of the crosslinking monomers include 1,3-butylene diacrylate, divinyl benzene and butylene dimethacrylate. Examples of graftlinking monomers are allyl acrylate, allyl methacrylate and diallyl maleate.

Additional preferred impact modifiers are of the type disclosed in U.S. Pat. No. 4,292,233. These impact modifiers comprise, generally, a relatively high content of a butadiene polymer grafted base having grafted thereon acrylonitrile and styrene.

Other suitable impact modifiers include, but are not limited to ethylene vinyl acetate, ethylene ethylacrylate copolymers, SEBS (styrene-ethylene-butylene styrene) and SBS (styrene-butadiene-styrene) block copolymers, EPDM (ethylene propylene diene monomer) and EPR (ethylene propylene rubber) copolymers, etc. All of these are well known to those skilled in the art and are available commercially.

The compositions of the present invention may further contain one or more reinforcing agents including glass fibers. Typical reinforcing agents useful in the practice of the present invention include, but are not limited to, glass fiber, talc, mica, clay or combinations thereof.

The filamentous glass which may be employed as a reinforcing agent in the present compositions is well known to those skilled in the art and is widely available from a number of manufacturers. For compositions to be employed for electrical uses, it is preferred to use fibrous glass filaments comprised of borosilicate glass that is relatively soda-free. This is more commonly known as "E" glass. However, other glasses are useful where electrical properties are not so important, e.g., the low soda glass known as "C" glass. The filaments are made by standard processes, e.g., by steam or air blowing, flame blowing and mechanical pulling. The filament diameters generally range from about 0.00012 to 0.00075 inches but this is not critical to the present invention.

Further, the glass fibers useful in the practice of the present invention may also be treated with functionalized silicon compounds to improve interaction with the polymer matrix, as is well known to those skilled in the art. Functionalized silanes, especially alkoxy silanes may be useful in this regard. Illustratively these include, but are not limited to, aminopropyl triethoxy silane, glycidyl propyl trimethoxy silane, (3,4-epoxy cyclohexyl) ethyl triethoxy silane; mercaptopropyl silane, aminoethyl aminopropyl alkoxy silane, ureido-alkyl trialkoxy silane and mixtures of any of the foregoing.

The length of the glass filaments and whether or not they are bundled into fibers and the fibers bundled in turn to yarns, ropes or rovings, or woven into mats and the like are also not critical to the present invention. However, in preparing molding compositions it is convenient to use the filamentous glass in the form of chopped strands of from about 0.0125 to about 2 inches long. In articles molded from the compositions on the other hand, even shorter lengths will be encountered due to fragmentation during compounding.

In general, the filamentous glass reinforcement comprises from about 2.5 to about 60% by weight based on the total weight of the compositions of the present invention. It is more preferred that the glass comprise from about 5 to about 55 and most preferred from about 20 to about 40% by weight of the total weight of the composition.

The present invention may further comprise a flame retardant compound. The flame retardant compound can be either halogen or phosphorus based. Any of the conventional halogenated aromatic flame retardants such as decabromodiphenyl ether, brominated phthalimides, brominated polyphenylene ethers, bromine containing polyacrylates or methacrylates, i.e., polypentabromobenzyl acrylate and/or brominated styrene polymers can be employed in the present invention. These are well known to those skilled in the art and are described in the patent literature. Preferred are derivatives of tetrabromo bisphenol A, such as its polycarbonate polymer or the polymer of its adduct with epichlorohydrin (brominated phenoxy resin). They may be used alone, or in conjunction with a synergist, particularly inorganic or organic antimony compounds. Such compounds are widely available or can be made in known ways. Especially preferred is antimony oxide.

Flame retardant embodiments of the present invention may further comprise a drip retardant agent to prevent dripping during burning. Such compounds are well known to those skilled in the art and include, but are not limited to, various fluorinated polyolefins. Particularly useful is polytetrafluoro- ethylene (PTFE). See, e.g., Wambach, U.S. Pat. No. 3,671,487.

The compositions of the present invention can also comprise a wide variety of other additives, such as UV stabilizers, pigments, colorants, fillers, plasticizers, processing aids, antioxidants and the like. Such components are added in effective amounts to impart the desired properties on the compositions of the present invention for the specific application.

The method of blending the compositions of the present invention is not critical and can be carried out by conventional melt processing techniques. One convenient method comprises blending the PBT resins (or PBT/PC resins) and other ingredients in powder or granular form, extruding the blend and comminuting into pellets or other suitable shapes. The ingredients are combined in any usual manner, e.g., by dry mixing or by mixing in the melted state in an extruder, on a heat mill or in other mixers.

An alternative method of blending can comprise preparing a preblend of the polyesters and then adding the other ingredients to the preblend. For example, a preblend of the PBT resins and stabilizer can be fed into the upstream port of an extruder with addition of the other ingredients such as glass fibers in a downstream port of the extruder.

In another embodiment, the various compounds can be precompounded, pelletized and then molded. Precompounding can be carried out in conventional equipment. For example, a dry blend of the ingredients can be fed into a single screw extruder, the screw having a long transition section to insure proper melting. Alternatively, a twin screw extrusion machine can be fed with the resins and other additives at the feed port and reinforcements fed downstream. In either case, a generally suitable machine temperature will be from about 450° to about 575° F.

The precompounded composition can be extruded and cut or chopped into molding compounds, such as conventional granules, pellets, etc. by standard techniques.

The compositions can be molded in any equipment conventionally used for thermoplastic compositions. For example, good results will be obtained in an injection molding machine, with conventional cylinder temperatures, e.g., 500° F., and conventional mold temperatures, e.g., 150° F.

The low molecular weight polyester may also be referred to in terms of number average molecular weight, and preferably has a number average molecular weight of from 10,000 to 20,000, more preferably from 15,000 to 19,000, and most preferably from 17,000 to 18,000. The high molecular weight polyester may also be referred to in terms of number average molecular weight, and preferably has a number average molecular weight of from 21,000 to 50,000, more preferably from 22,000 to 40,000, and most perferably from 30,000 to 38,000.

The low molecular weight polybutylene terephthalate resin preferably has an intrinsic viscosity (I.V.) of from 0.50 to 0.60 dl/g, more preferably from 0.54 to 0.59 dl/g, and most perferably from 0.57 to 0.58 dl/g. The high molecular weight polybutylene terephthalate resin preferably has an intrinsic viscosity of from 0.70 to 1.5, and more perferably from 0.70 to 1.2.

IV is measured at 25° C. by dissolving 0.12 g of polyester in 25 ml of a 60:40 w/w mixture of phenol/1,1,2,2- tetrachloroethane. Most preferred range for polyester/ polycarbonate blends in Mn=20,000 to 50,000.

EXAMPLES

All ingredients were blended together and processed on a 30 mm twin screw extruder at 250° C., 250 rpm. The pelletized extrudate was examined by differential scanning calorimetry (DSC) to determine the retention of crystallinity in the polyester phase under repeated heat treatment. In unstabilized polyester-polycarbonate blends reaction between the polymers reduces polyester crystallinity giving reduced temperature of crystallization (Tc), reduced heat of crystallization (Hc) and after sufficient heating, a reduced crystalline melting point (lower Tm) and lower heat of melting (Hm). These changes in crystallinity will effect melt processing into finished articles as well as mechanical properties.

Examples A–C and 1–2

For Examples A–C, 1–2 (Table 1) samples taken from pellets of the blends were tested in a Perkin Elmer Differential Scanning Calorimeter (DSC) using the following heat treatments: Initial scan was at 40° C./min to 290° C. The initial temperature and heat of melting (Tmi/Hmi) were recorded. The sample was held at 290° C. for 3 min and cooled to 40° C. The same sample was then heated to 290° C. the heat and temperature of melting were recorded (Tm1/Hm1). The sample was held at 290° C. for an additional 5 minutes and cooled again to 40° C. Another heat cycle took the sample to 290° C. Heat and temperature of melting were again recorded (Tm2/Hm2). The sample was held for an additional 5 min at 290° C., cooled to 40° C. and then reheated to 290° C. to record the third temperature and heat of melting (Tm3/Hm3). All temperatures are recorded at the peak of the transition. The heat of melting is recorded in Joules/gram (J/g). The rate of heating and cooling for all scans was 40° C./min.

Na Dodecyl Sulfate 98% was supplied by Eastman Kodak. The 70% sodium dodecyl sulfate was from Aldrich Chemical a mixture of about 70% sodium dodecyl sulfate, 25% sodium tetradecyl sulfate and 5% sodium hexadecyl sulfate. Lithium dodecyl sulfate was also supplied by Aldrich Chemical Co.

Note that the organo sulfate salts are effective in retaining the blend Tm and Tc as well as the heat of melting and heat of crystallization vs the blends with no additives.

TABLE 1

| Composition | A | 1 | B | 2 | C |
|---|---|---|---|---|---|
| PC | 50 | 50 | 50 | 50 | 50 |
| PBT | 50 | 50 | 50 | 50 | 50 |
| NaDS | — | 0.05 | — | 0.05 | — |
| NaDBS | — | — | 0.05 | — | — |
| DSC | | | | | |
| Tmi/Hmi | 228/27 | 229/30 | 229/27 | 230/28 | 229/29 |
| Tm1/Hm1 | 227/23 | 228/25 | 220/20 | 228/24 | 229/24 |
| Tm2/Hm2 | 215/22 | 224/27 | N/P | 224/26 | 217/19 |
| Tm3/Hm3 | N/P | 214/25 | N/P | 216/25 | N/P |

NaDS = Sodium Dodecylsulfate.
NaDBS = Sodium Dodecylbenzene sulfonate.
PC Lexan ® 105 Bisphenol A polycarbonate resin from General Electric Company.
PBT Valox ® 315 Polybutyleneterephthalate resin from General Electric Company.
N/P indicates no peak.

For Examples D, 3–9 (Tables 2 and 3) samples were extruded as in first examples, DSC analysis was modified as follows. Initial heat was to 290° C. at 20° C./min during which the initial temperature and heat of melting were recorded (Tmi/Hmi). The sample was held at 290° C. for 1 min and cooled to 40° C. at 40° C./min. temperature and heat of crystallinity were recorded (Tc1/Hc1). The sample was heated to 290° C. again, temperature and heat of melting were recorded (Tm1/Hm1). Sample was held at 290° C. for 15 min, cooled as above (Tc2/Hc2) and heated again to 290° C. Temperature and heat of melting were recorded (Tm2/Hm2). Sodium Oleyl sulfate was a 26 wt % aqueous solution, Magnesium bis-dodecyl sulfate was a 27% aqueous solution. Both samples were supplied by the Rhone-Poulenc Co.

TABLE 2

|  | D | 3 | 4 | 5 | 6 | 7 |
|---|---|---|---|---|---|---|
| PBT | 50 | 50 | 50 | 50 | 50 | 50 |
| PC | 50 | 50 | 50 | 50 | 50 | 50 |
| Na Dodecyl Sulfate 98% | — | 0.05 | — | — | — | — |
| Na Dodecyl Sulfate 70% | — | — | 0.05 | 0.20 | 0.50 | — |
| Li Dodecyl Sulfate | — | — | — | — | — | 0.05 |
| Tmi/Hmi | 224/24 | 224/21 | 222/22 | 223/22 | 224/22 | 223/25 |
| Tc1/Hc1 | 180/–22 | 178/–19 | 179/–19 | 179/–19 | 180/–21 | 181/–23 |
| Tm1/Hm1 | 223/21 | 223/19 | 222/21 | 222/18 | 222/21 | 222/21 |
| Tc2/Hc2 | none | 147/–8 | none | 181/–15 | 185/–17 | 143/–13 |
| Tm2/Hm2 | 197/7 | 212/18 | 205/12 | 221/19 | 222/22 | 209/21 |

TM = temperature of melting °C., Hm = heat of melting J/g, Tc = temperature of crystallization °C., Hc = heat of crystallization J/g

TABLE 3

|  | 8 | 9 |
|---|---|---|
| PC | 50 | 50 |
| PBT | 50 | 50 |
| Sodium Oleyl Sulfate | 0.192 | — |
| Magnesium Dodecyl Sulfate | — | 0.185 |
| Tmi/Hmi | 223/19 | 224/19 |
| Tc1/Hc1 | 183/–17 | 185/–16 |
| Tm1/Hm1 | 222/17 | 222/16 |
| Tc2/Hc2 | NP | 152/–5 |
| Tm2/Hm2 | 200/1 | 211/12 |

Examples E and 10–11

For Examples E, 10–11 (Table 4) samples were extruded on a 30 mm twin screw extruder set at 270° C. and 250 rpm. DSC analysis was done as in examples 9–10. PET was Crystar 3848 from the E.I. Dupont Co.

TABLE 4

|  | E | 10 | 11 |
|---|---|---|---|
| PET | 50 | 50 | 50 |
| PC | 50 | 50 | 50 |
| Na Dodecyl Sulfate 98% | — | 0.05 | 0.20 |
| Tmi/Hmi | 253/18 | 254/21 | 254/23 |
| Tc1/Hc1 | 186/−16 | 196/−19 | 192/−21 |
| Tm1/Hm1 | 249/13 | 251/16 | 251/16 |
| Tc2/Hc2 | 148/−9 | 170/−15 | 181/−19 |
| Tm2/Hm2 | 240/10 | 244/12 | 248/14 |

Examples F–I and 12–20

Examples F, G, H, I, 12–20 (Tables 5 and 6) blends of the polyesters and additives were extruded on a 30 mm twin screw extruder at 250° C. 250 rpm. The pellets were dried and melt viscosity (MV) was measured in poise at 250° C. over a period of 30 min. The changes in MV during heating for 15 and 30 min were recorded. Viscosity was measured on a Rheometrics parallel plate theometer. Radius was 12.5 mm gap, was 1 mm, rate was 10 radian/sec. at 15% strain. Samples were dried for 3 h at 125° C. prior to testing. High molecular weight PBT was Valox 315 (Mn=36,500, MV=8500 poise at 250° C., IV=1.2 dl/g in 60/40 w/w phenol/1,1,2,2-Tetrachloroethane). Low molecular weight was Valox 195 (Mn=17,500, MV=300 poise at 250° C., IV=0.57 dl/g in phenol TCE). Both resins from GE Plastics. Organo sulfate and sulfonate salts were as described previously. Note that the organo sulfate salts are effective in preventing the MV build during heating that is seen in the control experiment with no additive.

TABLE 6

|  | 17 | 18 | 19 | 20 | I |
|---|---|---|---|---|---|
| HMW PBT | 50 | 50 | 50 | 50 | 50 |
| LMW PBT | 50 | 50 | 50 | 50 | 50 |
| Magnesium Dodecyl Sulfate | 0.37 | 0.74 | — | — | — |
| Sodium Oleyl Sulfate | — | — | 0.38 | 0.77 | — |
| MV 250° C. |  |  |  |  |  |
| 3 min | 1930 | 1410 | 2130 | 2020 | 1920 |
| 15 min | 1760 | 1080 | 2410 | 2020 | 2460 |
| 30 min | 1530 | 880 | 2580 | 2040 | 2930 |
| % MV change |  |  |  |  |  |
| 3–15 min | −9% | −23% | +13% | 0% | +28% |
| 3–30 min | −21% | −38% | +21% | +1% | +53% |

The blends of Tables 1–4 provide examples of the beneficial effects of Alkyl Sulfate salts on the melt stability of PC-Polyester Blends. The test involves extrusion of 1:1 PC:PBT blends with stabilizer and subsequent heat treatment of these blends to examine retention of crystallinity. Reduction of crystallinity results from PC-polyester reaction and will cause changes in mechanical properties and processability.

The retention of crystallinity is better in the stabilized examples than the controls. The improved stabilization is more apparent at longer heat treatment (second heat) and at higher concentrations of stabilizer. 98% sodium dodecyl sulfate was obtained from Eastman or Aldrich Chemical. Li dodecyl sulfate monohydrate 99% and 70% sodium Dodecyl sulfate (with 25% sodium tetradecyl sulfate and 5% sodium hexadecyl sulfate) were obtained from Aldrich Chemical.

Note: Sodium Lauryl sulfate is the same as sodium dodecyl sulfate, a linear C12 hydrocarbon group sulfate salt.

Again, with regard to the high/low molecular weight polyester blends in Tables 5 and 6, the addition of alkyl sulfates reduces the viscosity build seen in the control. High

TABLE 5

|  | F | 12 | 13 | 14 | 15 | 16 | G | H |
|---|---|---|---|---|---|---|---|---|
| HMW PBT | 50 | 50 | 50 | 50 | 50 | 50 | 50 | 50 |
| LMW PBT | 50 | 50 | 50 | 50 | 50 | 50 | 50 | 50 |
| Li DS | — | 0.05 | 0.1 | 0.2 | — | — | — | — |
| Na DS | — | — | — | — | 0.1 | 0.2 | — | — |
| Na DBS | — | — | — | — | — | — | 0.1 | 0.2 |
| MV 250° C. |  |  |  |  |  |  |  |  |
| 3 min | 2240 | 2170 | 2040 | 1620 | 2170 | 1810 | 1890 | 1810 |
| 15 min | 2680 | 2240 | 1800 | 1110 | 2200 | 1650 | 2490 | 2190 |
| 30 min | 2950 | 2060 | 1520 | 920 | 2180 | 1570 | 3000 | 2660 |
| % MV change |  |  |  |  |  |  |  |  |
| 3–15 min | +20% | +3% | −12% | −32% | +1% | −9% | +27% | +21% |
| 3–30 min | +32% | −5% | −25% | −43% | 0% | −13% | +59% | +47% |

Li DS = Lithium dodecyl sulfate, Na DS = sodium dodecyl sulfate, Na DBS = sodium dodecyl benzene sulfonate. HMW PBT = Valox 315, LMW = Valox 195 (both from GE Plastics).
Note that the unstabilized control F shows a large MV increase. The organo sulfate salts of the invention (12–16) prevent an increase. High levels may accelerate loss of viscosity but at the appropriate concentration give good retention of the initial viscosity.
Note that the organo sulfonate salts (not part of the invention) have no effect on suppressing MV build.

level of additive may decrease viscosity but selection of the appropriate level of stabilizer will give good viscosity retention.

Viscosity was measured on a parallel plate rheometer using pellets dried for >2 h at 125° C. Radius was 12.5 mm gap was 1.0 mm. Frequency was 10 radians/sec at 15% strain. Temp. was 250° C.

We claim:

1. A thermoplastic composition blend comprising:
    (a) from about 20 to about 80 weight percent of a low molecular weight polyester resin having a number average molecular weight of less than 20,000, said low molecular weight polyester resin being obtained by polymerizing a glycol component containing at least 70 mol percent tetramethylene glycol and an acid component containing at least 70 mol percent terephthalic acid;
    (b) from about 20 to about 80 weight percent of a high molecular weight polyester resin having a number average molecular weight of greater than 25,000, said high molecular weight polyester resin being obtained by polymerizing a aliphatic or cycloaliphatic diol or mixtures thereof and an aromatic dicarboxylic acid; and
    (c) from about 0.01 to about 5 percent of an alkyl or alkaryl sulfate salt of an alkali metal or alkaline earth metal for retention of the viscosity of the said thermoplastic composition blend.

2. The composition of claim 1 wherein said sulfate salt is present at a level of from about 0.05 to about 1 percent by weight based on the total weight of the composition.

3. The composition of claim 1 wherein said low molecular weight polyester is a polyalkylene terephthalate present at a level of from 30 to 70 percent by weight based on the total weight of said composition, said high molecular weight polyester is a polyalkylene terephthalate present at a level of from 30 to 70 percent by weight based on the total weight of said composition.

4. The composition of claim 3 wherein said low molecular weight polyester is a polybutylene terephthalate resin having a molecular weight of 15,000 to 19,000, and said high molecular weight polyester is a polybutylene terephthalate resin having a molecular weight of 22,000 to 40,000.

5. The composition of claim 3 wherein said low molecular weight polyester is a low molecular weight polybutylene terephthalate resin, and said high molecular weight polyester is a high molecular weight polyester resin.

6. The composition of claim 4 wherein said sulfate salt is selected from the group consisting of Group IA metal alkyl sulfate salts and Group IIA metal alkyl sulfate salts.

7. The composition of claim 1 wherein said composition consists essentially of components (a), (b) and (c).

8. The composition of claim 1 wherein said thermoplastic composition blend includes an aromatic polycarbonate resin.

9. The method for melt processing a thermoplastic blend comprising a low molecular weight polyester resin and a high molecular weight polyester resin, said method comprising
    (a) admixing an alkyl or alkaryl sulfate salt of an alkali metal or alkaline earth metal in an effective amount for viscosity retention with a polyester resin and a polycarbonate resin to produce a thermoplastic resin composition, and
    (b) melt extruding said thermoplastic resin composition wherein said Polyester resin consist essentially of a low molecular weight polyester resin and a high molecular weight polyester resin, said low molecular weight polyester resin comprising from about 20 to about 80 weight percent of a low molecular weight polyester resin having a number average molecular weight of less than 20,000, said low molecular weight polyester resin obtained by polymerizing a glycol component containing at least 70 mol percent tetramethylene glycol and an acid component containing at least 70 mol percent terephthalic acid; said high molecular weight polyester resin comprises from about 20 to about 80 weight percent of a high molecular weight polyester resin having a number average molecular weight of greater than 25,000, said high molecular weight polyester resin obtained by polymerizing a aliphatic or cycloaliphatic diol or mixtures thereof and an aromatic dicarboxylic acid.

10. The composition of claim 8 wherein said aromatic polycarbonate resin is present at a level of from 30 to 70 percent by weight based on the total weight of the composition.

11. The method according to claim 9 wherein said polycarbonate resin comprises an aromatic polycarbonate resin present at a level of from 30 to 70 percent by weight based on the total weight of the thermoplastic composition.

* * * * *